No. 866,377. PATENTED SEPT. 17, 1907.
G. H. MEBOLD.
PUSH BUTTON.
APPLICATION FILED MAR. 16, 1907.
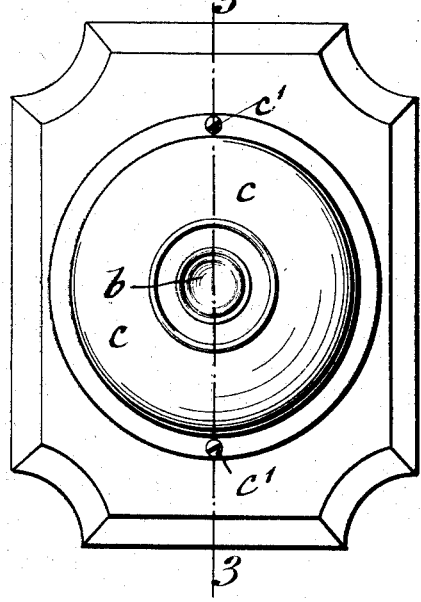
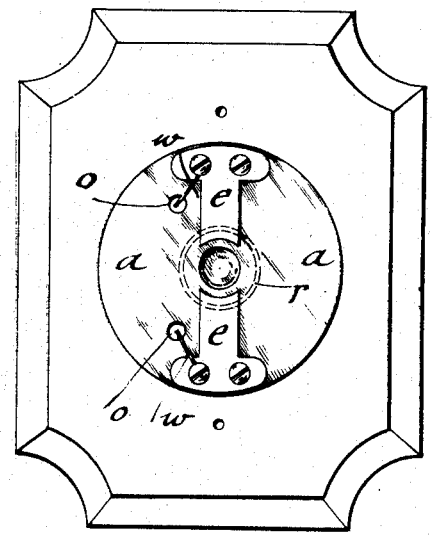
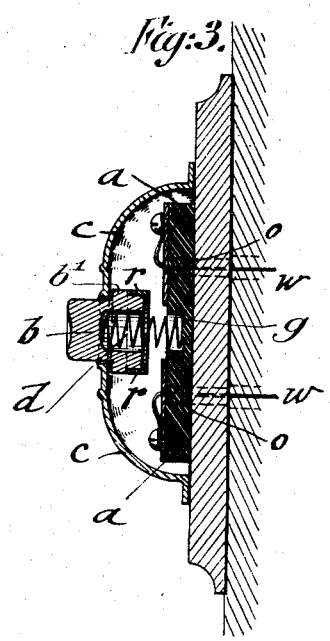
Witnesses:
David Levine
Henry J. Suhrbier
Inventor
George H. Mebold
By his Attorneys

UNITED STATES PATENT OFFICE.

GEORGE H. MEBOLD, OF NEW YORK, N. Y.

PUSH-BUTTON.

No. 866,377.

Specification of Letters Patent.

Patented Sept. 17, 1907.

Application filed March 16, 1907. Serial No. 362,686.

*To all whom it may concern:*

Be it known that I, GEORGE H. MEBOLD, a citizen of the United States, residing in New York, in the borough of Queens and State of New York, have invented certain new and useful Improvements in Push-Buttons, of which the following is a specification.

This invention relates to an improved push-button for electrical bell and other circuits, and it consists of a push-button comprising an insulated base-plate, metallic T-shaped contact-plates arranged radially on said insulated base-plate, a spring-actuated button provided with an interior metallic rim extending over the inner ends of the contact-plates, and an inclosing casing, as will be fully described hereinafter and finally pointed out in the claim.

In the accompanying drawings, Figure 1 is a front-elevation of my improved push-button, Fig. 2 is a front-elevation of the insulated base-plate and metallic contact-plates, with the push-button and casing removed, and Fig. 3 is a vertical transverse section on line 3, 3, Fig. 1.

Similar letters of reference indicate corresponding parts.

Referring to the drawings, $a$ represents the base-plate of my improved push-button. The base-plate $a$ is made of hard rubber or other insulating material and in the shape of a disk and provided with openings $o$ for the conducting-wires $w$. To the base-plate are attached, by means of fastening-screws, flat metallic contact-plates $e$, which are preferably made of T-shape, the inner portions of the plates extending towards each other. Over the base-plate $a$ extends a circular casing $c$, which has a circular opening at the center that serves for guiding a button $b$, which is provided at its inner end with a cylindrical cavity for receiving a helical spring $d$ by which a shoulder $b^1$ on the push-button is held against the edge of the opening of the casing $c$. The opposite end of the spring $d$ is seated in a depression $g$ in the base-plate $a$. The casing $c$ is attached by screws $c^1$ to the wall or other support. The inner end of the push-button $b$ is provided with a metallic rim $r$, of angular cross-section, which forms contact with the metallic plates $e$ whenever the push-button is pushed inwardly against the tension of the spring, said rim forming contact with the inner ends of both contact-plates and producing thereby the reliable closing of the circuit. As soon as the pressure is removed, the button is returned to its former position, so that the contact between its rim and the contact-plates is interrupted and thereby the electric circuit broken.

The insulated base-plate is attached in any suitable manner to the wall or other support where the push-button is to be used. The push-button is, owing to its simple construction, comparatively inexpensive, while it is reliable in use owing to the full contact produced by the rim of the push-button with the contact-plates.

Having thus described my invention, I claim as new and desire to secure by Letters Patent:

A push-button for electric circuits, consisting of an insulated base-plate, T-shaped contact-plates attached to the base-plate and extending radially towards each other, a casing extending over the base-plate and provided with a central opening, a push-button fitting in said opening and provided with a shoulder and an interior metallic rim, said rim being adapted to be placed in contact with the inner ends of the contact-plates, and a helical spring interposed between the base-plate and a cavity in the interior of the button.

In testimony, that I claim the foregoing as my invention, I have signed my name in presence of two subscribing witnesses.

GEORGE H. MEBOLD.

Witnesses:
PAUL GOEPEL,
HENRY J. SUHRBIER.